(12) United States Patent
Yoshida

(10) Patent No.: US 6,633,524 B1
(45) Date of Patent: Oct. 14, 2003

(54) METHOD FOR CONTROLLING ROTATION OF AN OPTICAL DISK DURING A ZONE CHANGE IN A DATA READ OUT OPERATION

(75) Inventor: Tohru Yoshida, Nakaniida-machi (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/315,453

(22) Filed: May 20, 1999

(30) Foreign Application Priority Data

May 20, 1998 (JP) .......................................... 10-137915

(51) Int. Cl.[7] ................................................. G11B 7/00
(52) U.S. Cl. .................................... 369/47.4; 369/53.29
(58) Field of Search ............................. 369/47.4, 47.41, 369/53.29

(56) References Cited

U.S. PATENT DOCUMENTS 5,481,531 A * 1/1996 Yamamuro 6,026,068 A * 2/2000 Obata et al.

* cited by examiner

Primary Examiner—W. R. Young
(74) Attorney, Agent, or Firm—Dilworth & Barrese, LLP

(57) ABSTRACT

A method for controlling the number of disk revolutions in a disk drive using a zone CLV control system to reduce or eliminate the possibility of read-out errors when the data read-out position is shifted from a current zone to a neighboring zone during a sequential data read-out operation. In accordance with the method, it is determined whether or not data to be read out is sequential data, when a zone change is made. Where sequential data is to be read out, the zone change is made under the condition in which the gain of a rotation control system for the disk motor is attenuated. Where the data to be read out is not sequential data, the gain of the disk motor rotation control system is increased. Under this condition, a seek operation is executed.

8 Claims, 4 Drawing Sheets

IN A SEQUENTIAL READ, THE GAIN OF THE MOTOR IS ATTENUATED TO GENTLY VARY THE NUMBER OF REVOLUTIONS

METHOD FOR CONTROLLING ROTATION OF AN OPTICAL DISK DURING A ZONE CHANGE IN A DATA READ OUT OPERATION

BACKGROUND OF THE INVENTION

1. Field of the Invention

The present invention generally relates to an optical disk drive such as a CD-ROM drive, and more particularly to a method for controlling the number of disk revolutions in an optical disk drive during a data-read operation.

2. Description of the Related Art

A well-known rotation control system used in disk drives adapted to drive an optical disk is a constant angular velocity (CAV) system in which data is read out from a disk in a constant number of disk revolutions. Another well-known rotation control system used in disk drives, is the constant linear velocity (CLV) system, where the number of disk revolutions is controlled to allow the transfer rate (i.e., Bits Per Second) of read-out data to be constant.

In optical disk drives using the CLV system, the number of disk revolutions must be controlled along with a control for the position of a pick-up when data access is carried out in accordance with a command from a host computer. As a result, an increase in mechanical load is involved. It is also difficult to achieve high-speed access using CLV systems. For this reason, a number of alternative rotation control systems have been used in optical disk drives such as CD-ROM drives, in place of the conventional CLV system.

In conventional CLV systems, in which rotation control is monitored in each data zone of the disk, velocity signal information is typically required. To generate such velocity signal information, synchronization signals are used which are recorded on the disk in the form of pit signals. When the rotating velocity of the disk comes into a range where reproduction of synchronization signals is enabled, a synchronization signal is accurately reproduced by a start-up circuit. In conventional CLV control systems, a phase locked loop (PLL) control based on an accurately reproduced synchronization signal may be used. That is, disk rotation can be controlled in a conventional CLV system by PLL-locking disk data in accordance with a velocity signal extracted from read-out data.

In conventional zone CLV control systems, however, the number of disk revolutions varies in a non-sequential manner between neighboring zones. In other words, the number of disk revolutions varies abruptly at the boundary between neighboring zones. For this reason, when the data read-out position is shifted from a zone to a neighboring zone during a sequential data read-out operation, read-out errors may be generated due to the abrupt variation in the number of disk revolutions occurring at the boundary between the two zones. Where successive data recorded over two zones on the disk is read out, a processor for performing servo control (i.e., a disk motor servo) detects a difference between the target number of disk revolutions and the actual number of disk revolutions at a point in time when the position for reading out the data is shifted from one of the zones to the other zone beyond the boundary therebetween. In this state, accordingly, the disk motor should be abruptly accelerated until the actual number of disk revolutions reaches the target number of disk revolutions. This results in an abrupt variation in the rotation of the disk, thereby resulting in an erroneous PLL lock. As a result, read-out errors may be generated.

This tendency to generate read-out errors may increase where the interval of each zone is increased. This is due to an increased variation in the number of disk revolutions. Where a reduced zone interval is used to solve this problem, another problem occurs in that there is a limitation in terms of hardware. For example, there is a limitation whereby the oscillation frequency of the disk drive's clock generator is susceptible to variations from unit to unit.

SUMMARY OF THE INVENTION

According to the present invention, as embodied and broadly described herein, a zone CLV control system divides the disk data recording region into a plurality of zones where independent CLV control is carried out in each respective zone. This system is comparable to a conventional CLV control system in which sequential rotation control is carried out over the entire region of the disk (i.e., between the inner and outer peripheries) in order to obtain a constant data transfer rate over the entire region of the disk. The present invention, however, differs from conventional zone CLV rotation control in that the control of the disk rotation is carried out independently in each respective zone thereby effectively preventing the generation of data read-out errors.

In accordance with one aspect, the present invention provides a method for controlling the number of disk revolutions in each zone of an optical disk drive having a data region divided into a plurality of zones comprising the steps of: determining whether or not a zone change occurs during a read-out of sequential data; and attenuating a gain of a rotation control system for a disk motor when it is determined that there is a zone change.

In accordance with another aspect of the present invention, a method is provided for controlling the number of disk revolutions in each zone of an optical disk drive having a data region divided into a plurality of zones comprising the steps of: determining whether or not data to be read out is sequential data, when a zone change occurs; and attenuating a gain of a rotation control system for a disk motor when it is determined that the data to be read out is sequential data and then executing a zone change. When it is determined that the data to be read out is not sequential data, the gain of the disk motor rotation control system is increased. Under this condition, a seek operation is executed.

The zone CLV control system of the present invention provides advantages over conventional CLV control systems in the reduction in the mechanical load such as the amount of heat generated from the spindle motor. This occurs because the variation in the number of disk revolutions is relatively small, thereby resulting in a reduction in the rotation control range.

BRIEF DESCRIPTION OF THE DRAWINGS

The foregoing and other objects, features and advantages of the present invention will become more apparent from the following detailed description when taken in conjunction with the accompanying drawings, in which.

DETAILED DESCRIPTION OF THE PREFERRED EMBODIMENT

Reference will now be made in detail to the preferred embodiments of the present invention.

Figure 1:
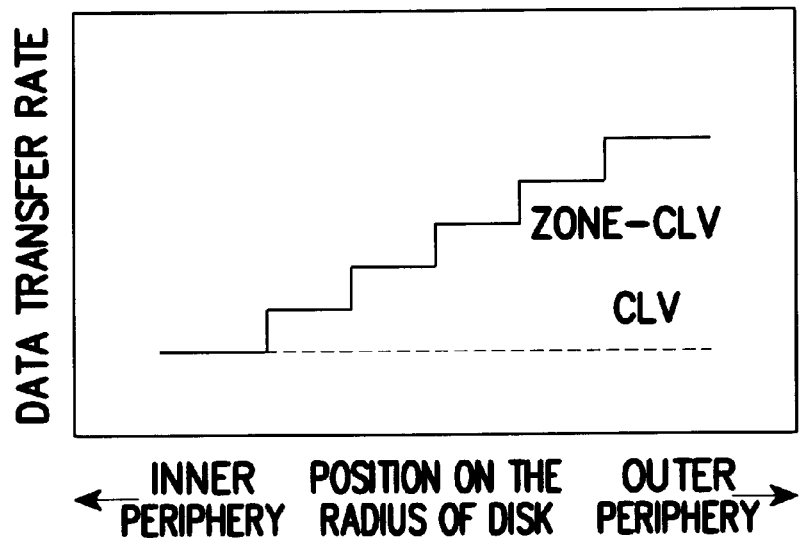
FIG. 1 is a graph illustrating the relationship between the data transfer rate and the data read-out position in a zone CLV control system in accordance with the present invention.

FIG. 1 is a graph illustrating the relationship between the data transfer rate (y-axis) and the data read-out position (x-axis) in the zone CLV control system of the present invention. In each zone, the data transfer rate is constant, as shown in FIG. 1. However, the data transfer rate increases for those zones nearest the outer periphery. Accordingly, the relationship between the data transfer rate and the data read-out position exhibits a step or staircase waveform characteristic. An increase in the number of zones results in an increase in the number of stages, but a decrease in the level or data transfer rate difference between successive stages.

Figure 2:
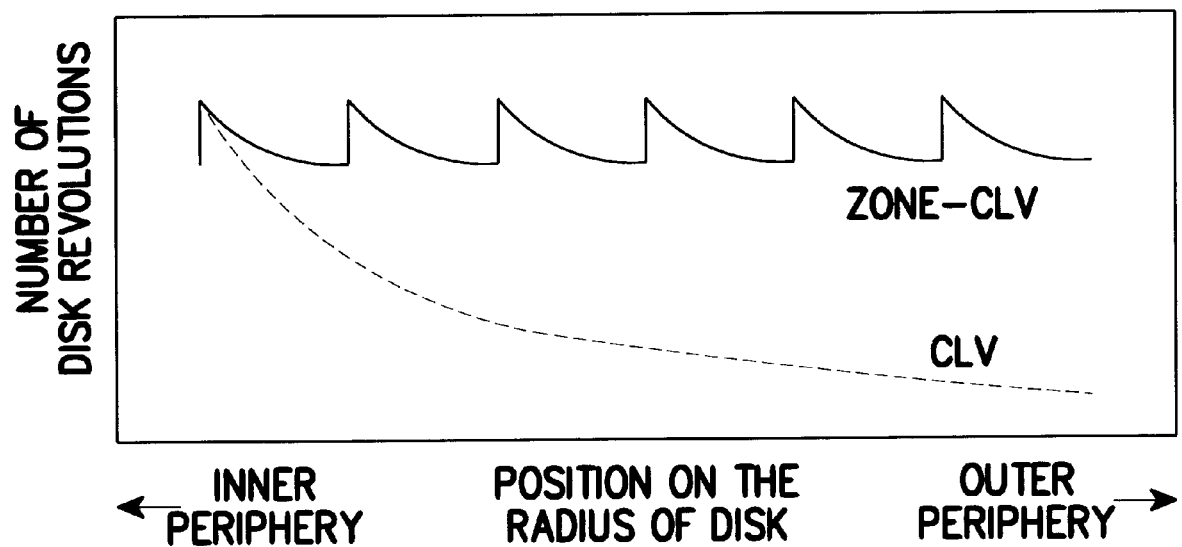
FIG. 2 is a graph illustrating the relationship between the data read-out position and the number of disk revolutions in the zone CLV control system in accordance with the present invention.

FIG. 2 is a graph illustrating the relationship between the number of disk revolutions (y-axis) and the data read-out position (x-axis) in the zone CLV control system. It is shown that the variation in the number of disk revolutions is constant in each zone. In such a state, a CLV control is carried out. Accordingly, control of the number of disk revolutions is represented in the form of a saw tooth waveform. That is, control of the number of disk revolutions is performed in a non-sequential manner as a function of the position on the radius of the disk (i.e., data readout position), as shown in FIG. 2. An increase in the number of zones results in a decrease in the interval of each zone, thereby resulting in a further decrease in the variation of the number of disk revolutions.

Figure 3:
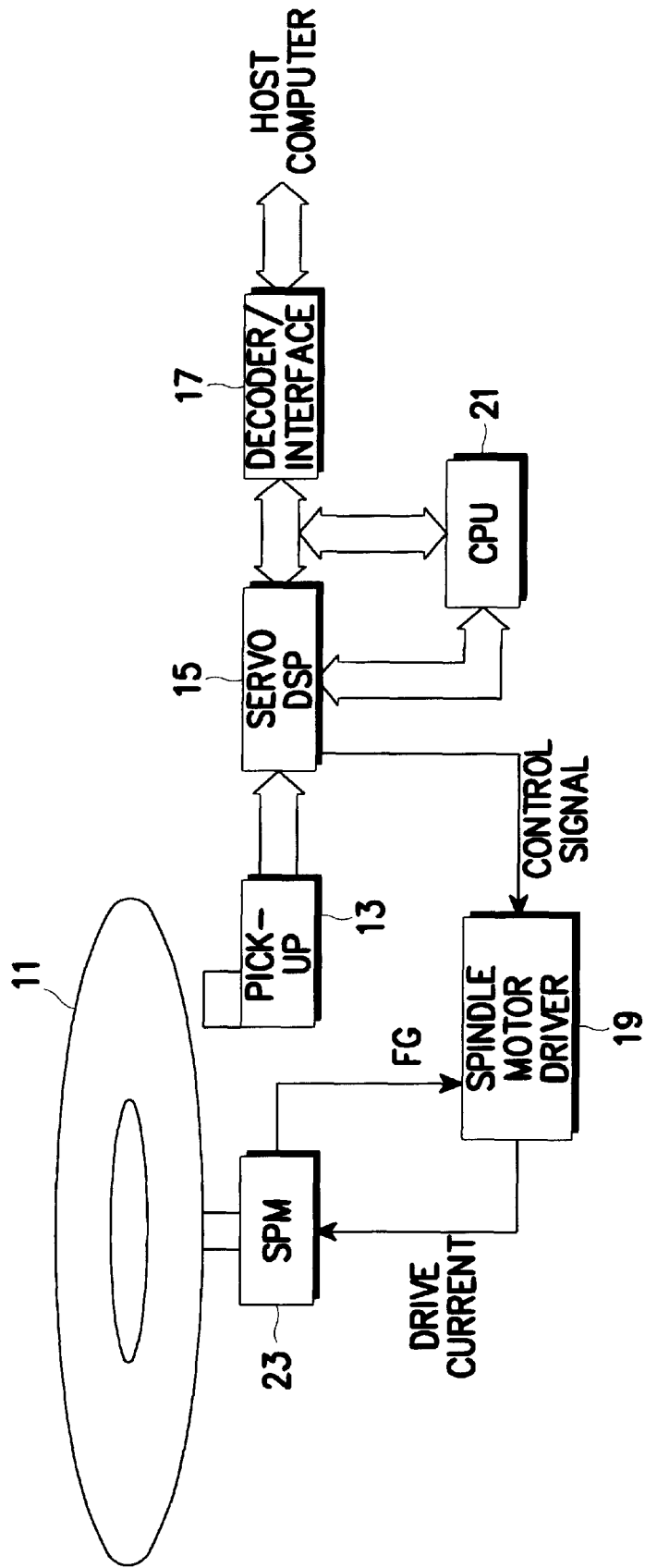
FIG. 3 is a block diagram illustrating the configuration of an optical disk drive in accordance with the present invention.

FIG. 3 is a block diagram illustrating the configuration of a CD-ROM drive as an optical disk drive. In the illustrated CD-ROM drive, a control for the position of a pick-up 13 is carried out by a servo digital signal processor (servo DSP) 15. A control signal containing information such as the target number of disk revolutions is sent from the servo DSP 15 to a spindle motor (SPM) driver 19. The SPM driver 19 serves to drive a disk motor, namely, a spindle motor (SPM) 23, in accordance with the control signal received from the servo DSP 15, thereby rotating a disk 11 loaded in the CD-ROM drive an appropriate number of revolutions. Data read out from the disk 11 by the pick-up 13 is sent to a host computer via a decoder interface unit (ROM DEC+I/F) 17. The overall operation of the servo DSP 15 is controlled by a central processing unit (CPU) 21.

In the optical disk drive having the above mentioned configuration, the control for the number of revolutions of the disk 11 is carried out in association with the position of the pick-up 13. To this end, the SPM driver 19 controls the rotation of the SPM 23 in accordance with the control signal received from the servo DSP 15. Where such a control system has a gain set to a higher value, it exhibits more direct response characteristics. At a lower gain value, the response of the control system is slower.

In the case of a conventional CLV control system, it is necessary to set the gain of the motor rotation control system to a high value so as to achieve an improvement in the dependency on the shift of the read-out position of a pick-up as well as an improvement in the rotation stability. In disk drives using the method of the present invention (i.e., the zone CLV system), however, direct response characteristics of the control system are a cause of read-out errors because they result in an abrupt rotation variation at the boundary between neighboring zones. Of course, the generation of read-out errors may be prevented by normally attenuating the gain of the motor rotation control system to a level sufficient to preclude the generation of read-out errors. This situation, however, causes a degradation in the response characteristics and stability of the control system. In particular, where it is necessary for the control system to have a certain level of gain, in consideration of high mechanical load characteristics of components like the spindle motor, the method of the present invention cannot be used.

In accordance with the method of the present invention, adverse influences on data read-out are prevented by carrying out rotation control with a relatively high gain value capable of providing sufficient stability during a general data read-out operation, as in the conventional method. However, the present invention is distinguishable from the conventional method in that when a change of the data read-out zone is detected during a sequential data read-out, the gain is temporarily lowered, thereby preventing an abrupt rotation variation from occurring immediately after a read-out zone change.

Figure 4:
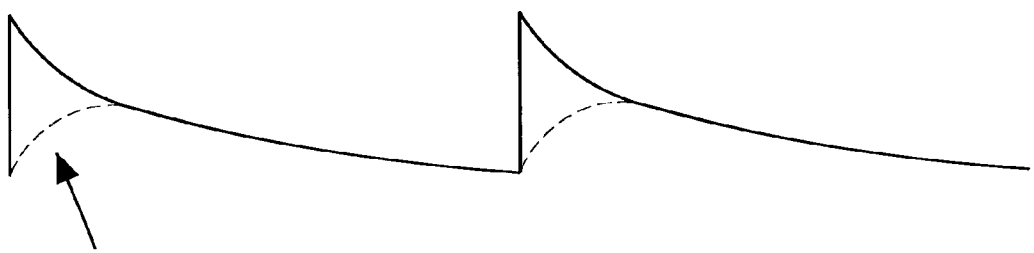
FIG. 4 is a graph illustrating characteristics of the zone CLV control, in terms of the number of disk revolutions, in accordance with a control method of the present invention.

FIG. 4 is a graph illustrating characteristics of the zone CLV control, in terms of the number of disk revolutions. Referring to the waveform of FIG. 4, it is shown that the number of disk revolutions varies gradually upon a change of the data read-out zone during a sequential data read-out, as compared to that during a general data read-out (solid line). Thus, little or no generation of read-out errors occurs in the sequential data read-out. This is true because upon detection of a zone change, the gain of the rotation control system is attenuated.

Figure 5:
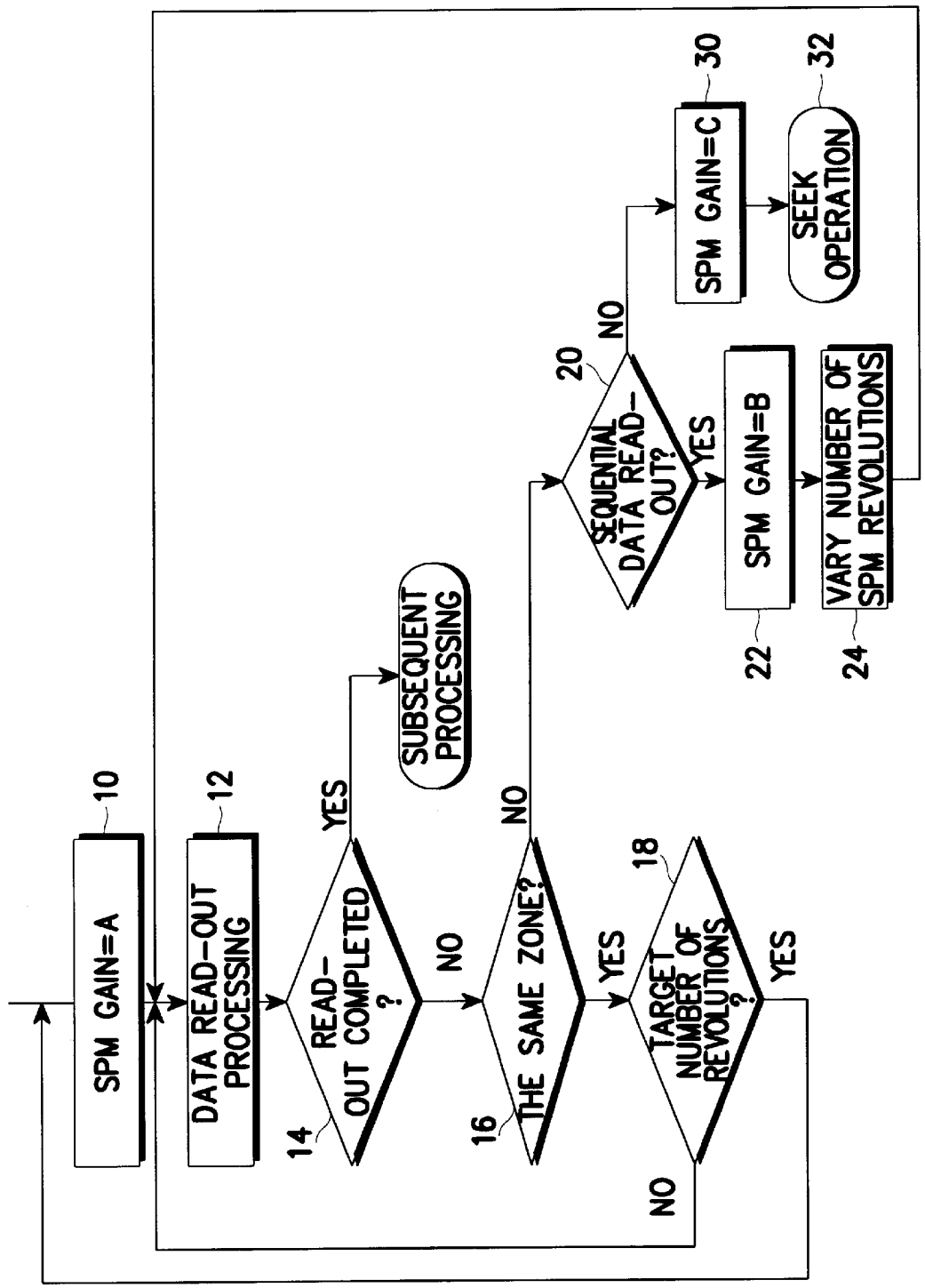
FIG. 5 is a flow chart illustrating a method for controlling the number of disk revolutions in a disk drive of the zone CLV system in accordance with the present invention.

FIG. 5 is a flow chart illustrating a method for controlling the number of disk revolutions in a disk drive of the zone CLV system in accordance with the present invention.

Referring to FIGS. 3 and 5, when the disk drive receives a read-out command from the host computer, it moves the pick-up 13 to a position where data is to be accessed. The SPM driver 19 then drives the spindle motor 23 in a desired number of revolutions. The SPM gain of the motor rotation control system at this time is set to a value associated with a general data read-out. That is, at step 10, the SPM gain is set to a value A. At step 12, a data read-out operation is begun, so that the data requested by the host computer is read out sequentially. The read-out data is then sent to the host computer at a desired data transfer rate according to a CLV control signal. At step 14, it is determined whether or not the data read-out has been completed. Where the data read-out has not been completed yet, it is then determined at step 16 whether or not a zone change has been made. When it is determined that no zone change has been made; it is then determined at step 18 whether or not the current number of revolutions has reached the target number of revolutions for the current zone. When the current number of revolutions has not reached the target number of revolutions, the control procedure returns to step 12. Otherwise, when the current number of revolutions has reached the target number of revolutions, the control procedure returns to step 10.

Where it is determined at step 16 that a zone change has been made, the control procedure proceeds to step 20. At step 20, it is determined whether or not sequential data is to be read out. The determination for read-out of sequential data at step 20 is executed by determining sequentiality of addresses.

With regard to the read-out of sequential data, a brief description will be made. Although the host computer requires a large quantity of data from the disk, in actual operation, the host computer instructs the disk drive to read out a small quantity of data in a sequential manner. To this end, the disk drive checks the sequentiality of data required by the host computer. For instance, although data has an incomplete sequentiality, the disk drive reads data in a pseudo-sequential manner by performing successive data reads by reading those sequential portions in successive data read operations.

When it is determined at step 20 that the current data read-out is a sequential data read-out, the control procedure proceeds to step 22. At step 22, the control gain for data is attenuated to a value B at which no abrupt variation in the number of disk revolutions occurs. Thereafter, the control procedure proceeds to step 24. At step 24, a variation in the number of revolutions of the spindle motor 23 is executed and the control procedure returns to step 12. On the other hand, when it is determined at step 20 that the current data read-out does not correspond to a sequential data read-out, the control procedure proceeds to step 30 at which the control gain for data is changed to a value C higher than that in the normal case. In this case, a seek operation for rapidly shifting the pick-up 13 to a desired data position is executed at step 32. Although a zone other than the zone being currently accessed is required, a reduction in control time is achieved because the control gain for data is set to a value C which is enough high to obtain direct response characteristics. Thus, high-speed access can be achieved.

In the illustrated embodiment of the present invention, the gain values of the motor rotation control system set in accordance with respective operations have the relationship of "C>A>B.

As apparent from the above description, the present invention provides a method for controlling the number of disk revolutions in a disk drive using a zone CLV control system, in which the gain of a motor rotation control system is appropriately varied, thereby achieving stability and dependability required in a general read-out operation in terms of the number of disk revolutions while effectively preventing the generation of data read-out errors in a read-out operation for sequential data existing between different zones.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention. All such changes and modifications are intended to be included within the scope of the invention as defined by the appended claims.

What is claimed is:

1. A method for controlling the number of disk revolutions of an optical disk in an optical disk drive device, the disk having a data region divided into a plurality of zones, the method comprising the steps of:

determining whether a zone change occurs during a read-out of sequential data; and attenuating a gain of a rotation control system for a disk motor when it is determined that a zone change occurred during the read-out of sequential data, thereby controlling the disk motor and the number of disk revolutions, to prevent read-out errors that commonly occur after a zone change due to an abrupt variation in the number of disk revolutions.

2. The method in accordance with claim 1, further comprising the steps of:

increasing said gain of said disk motor rotation control system when it is determined that said data being read out is not sequential data; and executing a seek operation.

3. The method in accordance with claim 2, wherein said gain is increased to a value greater than a predetermined gain value.

4. The method in accordance with claim 1, wherein said gain of the rotation control system is reset to a predetermined value subsequent to completion of said sequential data read out.

5. A method for controlling the number of disk revolutions of an optical disk in an optical disk drive device, the disk having a data region divided into a plurality of zones, the method comprising the steps of:

determining whether or not a zone change has occurred;

reading out data;

determining whether or not data being read out is sequential data when a zone change occurs; and attenuating a gain of a rotation control system for a disk motor when it is determined that said data being read out is sequential data, thereby controlling the disk motor and the number of disk revolutions, to prevent read-out errors that commonly occur after a zone change due to an abrupt variation in the number of disk revolutions.

6. A method for controlling the number of disk revolutions of an optical disk in an optical disk drive device, the disk having a data region divided into a plurality of zones and the disk drive device including an optical pickup and a spindle drive motor, the method comprising the steps of:

moving the pickup to a zone to read out data;

driving the spindle motor at a predetermined gain value to rotate the disk;

reading out data;

determining if the data being read out is sequential data;

determining if a zone change has occurred;

maintaining the predetermined gain value of the spindle motor if no zone change has occurred; and attenuating the gain value of the spindle motor if a zone change has occurred and said data being read out is sequential data, thereby controlling the spindle motor and the number of disk revolutions, to prevent read-out errors that commonly occur after a zone change due to an abrupt variation in the number of disk revolutions.

7. A method according to claim 6, wherein a seek operation is executed if the data being read out is determined not to be sequential.

8. A method according to claim 6, wherein the predetermined gain value is set in accordance with a general data read out.

* * * * *